May 13, 1924.
A. C. SCHAEFER
TUBE WELDING MACHINE
Filed July 29, 1921   2 Sheets-Sheet 1
1,493,648
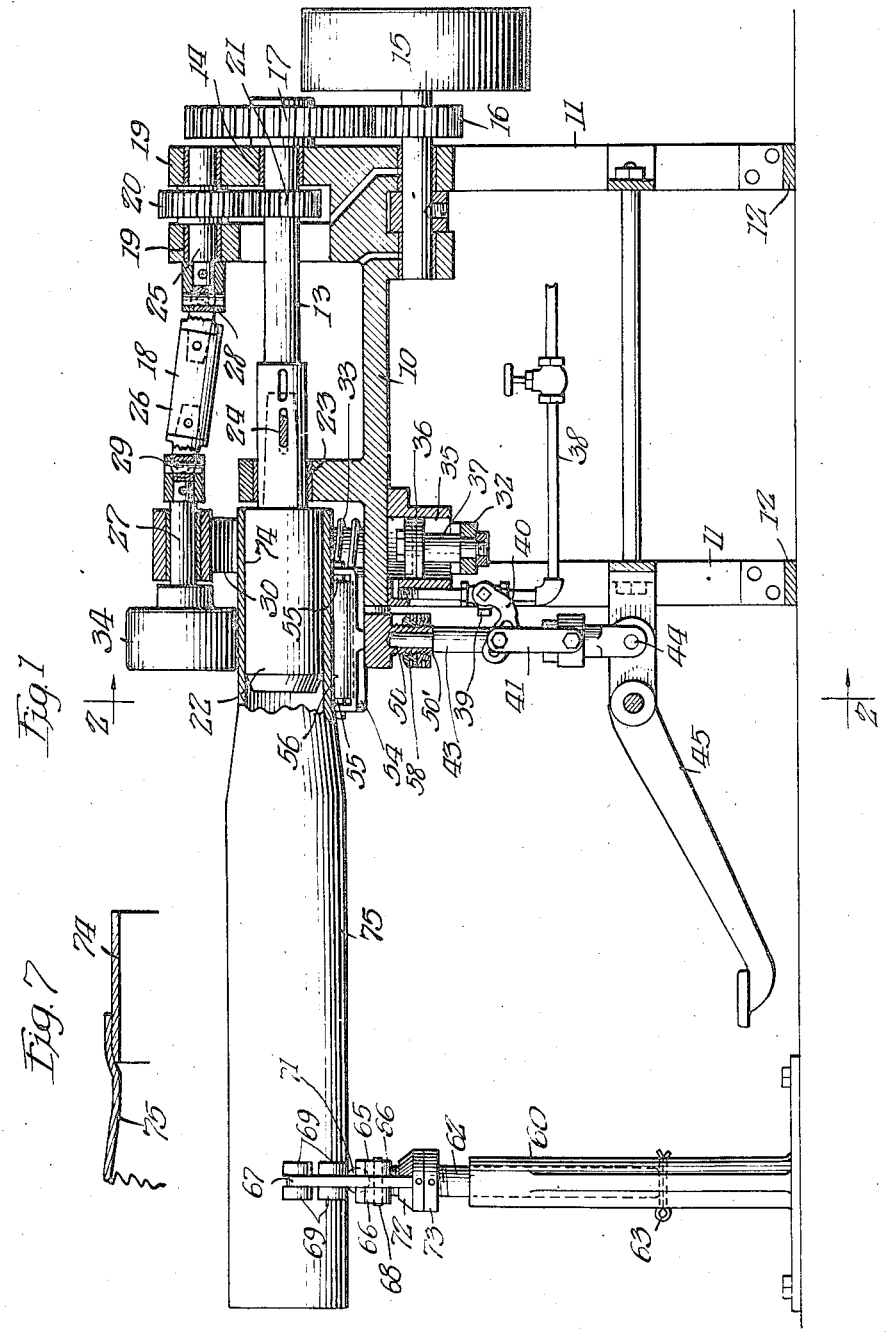
Inventor:
August C. Schaefer,
By Fisher, Towle, Clapp & Soans
Attys.

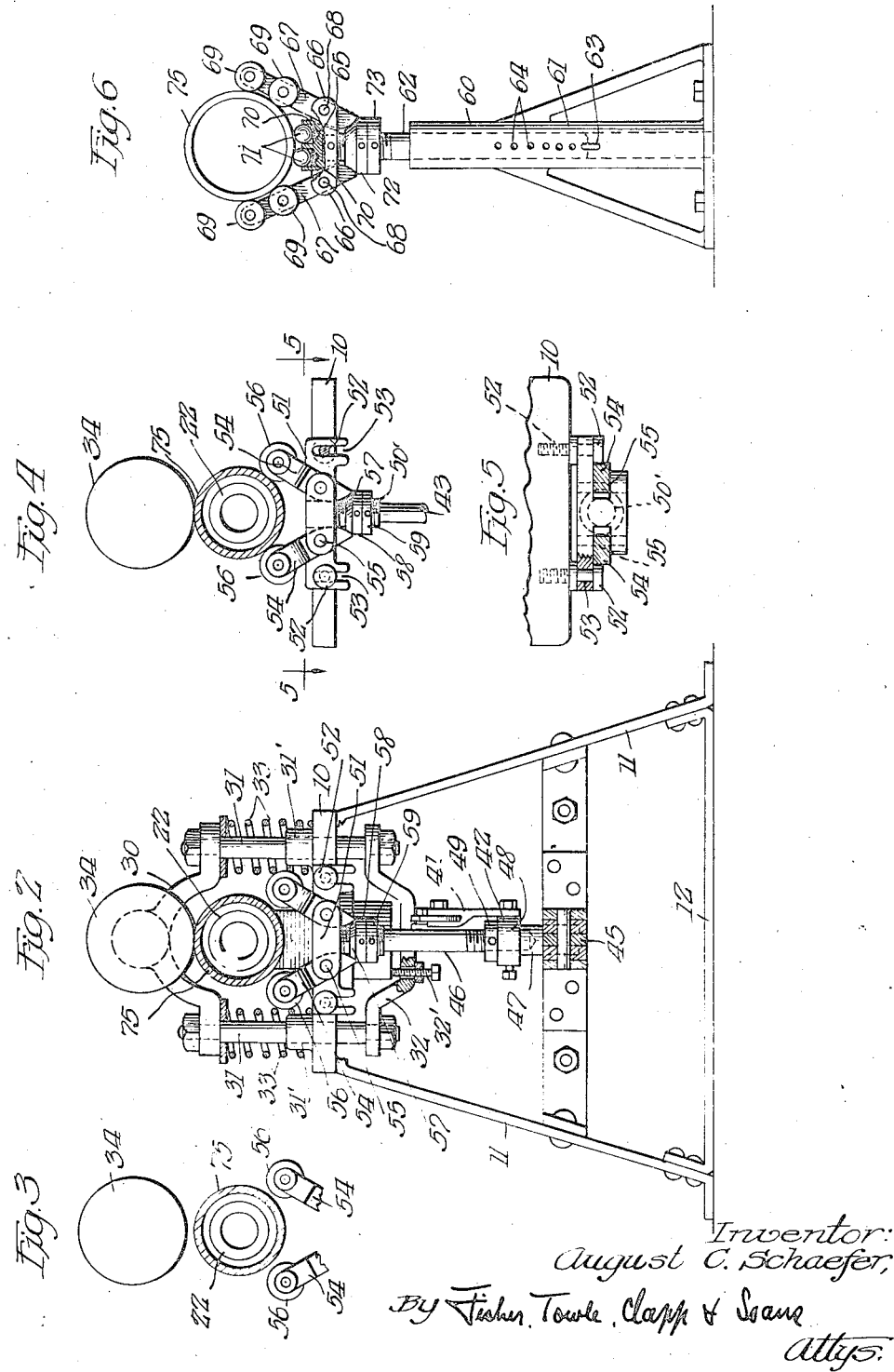

Patented May 13, 1924.

1,493,648

UNITED STATES PATENT OFFICE.

AUGUST C. SCHAEFER, OF OELWEIN, IOWA.

TUBE-WELDING MACHINE.

Application filed July 29, 1921. Serial No. 488,269.

*To all whom it may concern:*

Be it known that I, AUGUST C. SCHAEFER, a citizen of the United States, residing at Oelwein, in the county of Fayette and State of Iowa, have invented certain new and useful Improvements in Tube-Welding Machines, of which the following is a specification.

This invention relates to machines for welding together sections of metal tube but more particularly to that class in which the welded joint is produced by the operation of rolls, and has for its primary object to provide a machine which will economically and efficiently weld all sizes of tubes.

Further objects of the invention are to insure parallel contact of the upper or welding roll and the tube sections for all sizes of tubes; to provide an improved mounting for the welding roll; to provide an improved driving mechanism for the welding roll; to provide an improved mechanism for moving the welding roll into pressing engagement with the tube sections on the mandrel which is adjustable for different sizes of tubes; to provide a new and advantageous mounting for the lower rolls which permits adjustment in height and distance between centers of the rolls; to provide a new and advantageous back rest which is adjustable for different sizes of tubes and which prevents distortion of the heated ends of the tube sections; to avoid slippage; and in general to provide a new and improved cross-welding machine.

The many other objects and advantages of the invention will be better understood by reference to the following specification when considered in connection with the accompanying drawings illustrating a selected embodiment thereof in which:—

Fig. 1 is a side elevation partially in section of the tube welding machine with the upper or welding roll operating upon tube sections carried by the mandrel.

Fig. 2 is a vertical section on the line 2—2 of Fig. 1.

Fig. 3 is a detail view of a portion of the machine as shown in Fig. 2 but with the upper and lower rolls in their neutral or inoperative position.

Fig. 4 is substantially the same as Fig. 3 with the upper and lower rolls in engagement with the tube sections on the mandrel.

Fig. 5 is a section on the line 5—5 of Fig. 4.

Fig. 6 is a detail front elevation of the back rest, and

Fig. 7 is a detail view showing the tube sections in position for the welding operation.

Referring to the drawings, a base plate 10 is mounted on legs 11 supported by cross braces 12. A mandrel shaft 13 is supported near its rear end in a journal box 14 on the plate 10. This shaft 13 is driven by a pulley 15 or other suitable power element through the medium of gears 16 and 17. A revoluble mandrel 22 is supported in the journal 23 and coupled to the mandrel shaft 13 at 24.

A shaft 18 above the shaft 13 has its rear end supported by journal boxes 19 on the base plate. This shaft 18 is driven by a gear 20 in mesh with a corresponding gear 21 on the mandrel shaft 13. The shaft 18 in the present embodiment is composed of three sections 25, 26 and 27 connected by universal joints 28 and 29. The forward section 27 is journaled in a bracket 30 secured to the upper extremities of a pair of upright posts 31. These posts 31 are vertically slidable in guides 31' in the base plate 10 and have their lower extremities connected by a bracket 32. The frame composed of the brackets 30 and 32 and their connecting posts 31 is yieldingly supported by springs 33 acting between the underface of the bracket 30 and the upper face of the base plate 10. An upper or welding roll 34 is mounted upon the section 27 of the shaft 18. The axis of the shaft section 27 is parallel with the axis of the mandrel and is always maintained in this relation by its journal box. The remaining sections of the shaft 18 and the universal joints form a flexible driving shaft for the section 27 which permits this section to be raised or lowered with the frame. This form of drive for the welding roll is particularly advantageous for it insures parallel contact of the roll and tube for all sizes of mandrel and tube. An adjusting screw 32' is provided to limit the upward movement of the frame supporting the upper or welding roll 34.

A vertically disposed cylinder 35 is secured at its upper end to the underface of the base plate 10 and a piston 36 operates in this cylinder. A piston rod 37 has its opposite extremities connected to the piston 36 and the bracket 32. The piston 36 is actuated by air under pressure admitted to the upper end of the cylinder 35 from the feed pipe 38. The admission of air to the cylinder 35 is controlled by a three-way valve 39 operated by a crank arm 40 connected at its outer slotted extremity to the upper extremity of an arm 41. The lower extremity of the arm 41 is attached to a collar 42 adjustably mounted on a rod 43 having its lower bifurcated extremity pivotally connected at 44 to the inner extremity of a foot treadle 45. The rod 43 is preferably formed in two sections, 46 and 47, the section 47 being provided with a threaded socket 48 to receive the threaded extremity of the section 46. This form of connection between the sections 46 and 47 of the rod 43 permits the length of this rod to be adjusted for different sizes of tube. A jam nut 49 is provided to lock these sections in their adjusted position. The upper extremity of the section 46 of the rod 43 fits within a socket 50 in the shank 50' of a head or yoke 51.

The yoke 51 is movable vertically with the rod 43 and is guided by headed pins 52 acting in slots 53 in the yoke. The pins 52 are seated in the base plate 10. Oppositely disposed arms 54 are pivotally mounted at 55 in the yoke 51. The upper extremity of each of the arms 54 is bifurcated and a roll 56 is trunnioned in the bifurcated end. The lower rounded end of each of the arms 54 contacts with the conical upper face 57 of an adjusting nut 58 which fits upon the threaded shank 50' of the yoke. Movement of the adjusting nut 58 longitudinally of the shank varies the distance between centers of the rollers 56. A lock nut 59 is provided to maintain the nut 58 in its adjusted position. The normal height of the rollers 56 is varied by adjustment of the rod 43.

A back rest 60 is provided to support the outer tube section. This back rest comprises a hollow base or standard 61 which supports a vertical post 62 slidable therein. The height of the post 62 is determined by the position of a cotter pin 63 which may be inserted in any one of a plurality of aligned perforations 64 to form a support for the base of the post. A head or yoke 65 is secured upon the upper end of this post, and this head is provided with a pair of oppositely projecting lugs 66, each having a bifurcated end with an arm 67 pivotally mounted therein at 68. Rollers 69 are revolubly mounted on opposite sides of each of these arms. The upper face of the head 65 is provided with ball cups 70 in which are seated balls 71. An adjusting nut 72 fits on the threaded upper portion of the post 62 and the curved lower extremities of the arms 67 engage the conical upper portion of this nut. This nut varies the distance between centers of the corresponding rolls on the arms 67 for different sizes of tube in the same manner as the nut 58 on the rod 43. A lock nut 73 is provided to retain the nut 71 in its adjusted position. The height of the head 65 is adjusted so that the tube section will rest on the balls 71 and be supported thereby with its axis in alignment with the axis of the mandrel.

Preparatory to the welding operation, a mandrel of proper size is secured upon the mandrel shaft. It is desirable that the peripheral speed of the mandrel and the upper or welding roll be substantially equal in order to avoid slippage, although slight variation is immaterial and three sizes of upper rolls will usually be sufficient for use with the various sizes of mandrels. The gearing which actuates the welding roll is proportioned with this object in view. The height of the rod 43 and the distance between centers of the lower rolls is adjusted for the particular size of tube in the manner described. The height of the back rest is adjusted so that the outer section of tube will rest upon the balls 71 with the axis of the section in alignment with the axis of the mandrel. The distance between centers of the rollers 69 is likewise adjusted so that these rollers fit the outer tube section and prevent lateral movement thereof.

The tube sections 74 and 75 are now successively placed upon the mandrel with their heated ends preferably overlapping in the manner indicated in Fig. 7, and the rotation of the mandrel begun. The joint of the tube sections should be directly beneath the center of the welding roll. The balls 71 and rollers 69 of the back rest form a bearing for the outer portion of the tube section 75 which permits this section to rotate with the mandred without material resistance. This is important as it prevents distortion of the heated ends of the tube sections.

The foot treadle is now depressed sufficiently to open the valve 39 and admit air under pressure to the cylinder but insufficiently to bring the lower rolls into contact with the tube sections. The admission of air to the cylinder depresses the welding roll frame and brings this roll into pressing engagement with the tube sections at the joint. As soon as the welding has been accomplished by the welding roll, the foot treadle is further depressed to bring the lower rolls into pressing engagement with the tube sections. These lower or finishing rolls straighten the tube after the weld is made. Upon the completion of the finishing operation, the foot treadle is released and returns to its normal position, drawing down the rod 43 and opening the three-way valve to permit the air in the cylinder to escape into the atmosphere. The frame carrying the upper roll is now returned to its elevated position by the springs 33. The welded tube is then withdrawn.

One of the most important features of my invention is the parallel relation maintained by the welding roll and the tube throughout the welding operation irrespective of the size of the tube. This insures a perfect weld. When the welding is accomplished by a swinging movement of the roll, the axes of the roll and tube cannot be in parallel relation at more than one point in the operation and the relative angular movement causes an uneven pressure on the tube joint.

The frame carrying the welding roll provides a rigid support for this roll during the welding operation and the guides in the base plate insure true movement of the frame. The adjustability of the lower rolls permits the machine to operate efficiently on all sizes of tubes. These rolls are positively moved into engagement with the tube on the mandrel at the will of the operator and independently of the movement of the welding roll. The actuation of the lower rolls by the foot treadle controlling the operation of the welding roll is very convenient for the operator. The mounting of the cylinder on the under face of the base plate is very advantageous, as will be readily evident.

This machine may be advantageously used to perform any variety of tube welding but is particularly useful in welding the flues of boilers.

I am aware that many changes may be made in the form and arrangement of parts without departing from the spirit of my invention, and I reserve the right to make all such as fairly fall within the scope of the following claims.

I claim as my invention:

1. A tube welding machine comprising a revoluble tube supporting member, a revoluble welding member disposed in parallel relation with said tube supporting member, means for positively rotating said members, and means for moving one of said members toward the other in said relation.

2. A tube welding machine comprising a revoluble mandrel, a revoluble welding roll disposed in parallel relation with said mandrel, means for positively actuating said mandrel and said roll, and means for moving said roll toward said mandrel in said relation.

3. A tube welding machine comprising a revoluble mandrel, means for actuating said mandrel, a revoluble welding roll disposed in parallel relation with said mandrel, means for positively actuating said roll, and means for moving said roll toward said mandrel in said relation.

4. A tube welding machine comprising a revoluble mandrel, means for positively actuating said mandrel, a revoluble welding roll disposed in parallel relation with said mandrel, means for moving said roll toward said mandrel in said relation, and a flexible shaft for rotating said roll.

5. A tube welding machine comprising a revoluble mandrel, a frame, a revoluble welding roll mounted in said frame in parallel relation with said mandrel, means for positively actuating said roll and said mandrel, and means for bodily moving said frame to carry said roll toward said mandrel in said relation.

6. A tube welding machine comprising a revoluble mandrel, a frame, a revoluble welding roll mounted in said frame in parallel relation with said mandrel, means for actuating said mandrel, a flexible shaft for actuating said roll, and means for bodily moving said frame to carry said roll toward said mandrel in said relation.

7. A tube welding machine comprising a bed plate, a revoluble mandrel mounted on said plate, a revoluble welding roll disposed in parallel relation with said mandrel, a supporting frame for said roll slidably mounted in guides in said plate, means for bodily moving said frame in said guides to bring said roll into operative relation with said mandrel and means for positively rotating said welding roll.

8. A tube welding machine comprising a support, a revoluble mandrel mounted on said support, longitudinally movable upright posts mounted on said support, a revoluble welding roll supported by said posts, and means for moving said posts to bring said roll into operative relation with said mandrel.

9. A tube welding machine comprising a bed plate, a revoluble mandrel mounted on said plate, upright posts slidably mounted in guides in said plate, a bracket connecting the upper ends of said posts, a welding roll journaled in said bracket in parallel relation with said mandrel, a second bracket connecting the lower extremities of said posts, and means for depressing said lower bracket to move said roll toward said mandrel in said relation.

10. A tube welding machine comprising a bed plate, a revoluble mandrel mounted on said plate, upright posts disposed on opposite sides of said mandrel and slidable longitudinally in guides in said plate, a bracket connecting the upper ends of said posts, a welding roll revolubly mounted in said bracket in parallel relation with said mandrel, a second bracket connecting the lower extremities of said posts, and pneumatic means engaging said second bracket to move said roll into operating relation with said mandrel.

11. A tube welding machine comprising a base plate, a revoluble mandrel supported above said plate, a revoluble welding roll disposed above said mandrel, and pneumatic means disposed beneath said plate for moving said roll into operative relation with said mandrel.

12. A tube welding machine comprising a base plate, a revoluble mandrel supported above said plate, a revoluble welding roll above said plate opposite said mandrel, pneumatic means disposed beneath said plate for moving said roll into operative relation with said mandrel, and means for returning said roll to its inoperative position upon the release of said pneumatic means.

13. A tube welding machine comprising a base plate, a revoluble mandrel supported above said plate, a revoluble welding roll above said mandrel and opposite thereto, a supporting frame for said roll extending through said plate, and pneumatic means disposed beneath said plate for depressing said frame to bring said roll into operative relation with said mandrel.

14. A tube welding machine comprising a base plate, a mandrel revolubly mounted on said plate, a pair of spaced finishing rolls disposed opposite to said mandrel with their axes parallel with the axis of the mandrel, and means for adjusting the spacing of said rolls, and means for moving said rolls toward and from said mandrel.

15. A tube welding machine comprising a revoluble mandrel, means for actuating said mandrel, a pair of rolls disposed opposite to said mandrel, means for adjusting the normal distance of said rolls from said mandrel, and means for moving said rolls into operative relation with said mandrel.

16. A tube welding machine comprising a revoluble mandrel, a welding roll disposed opposite to said mandrel, means for moving said roll into operative relation with said mandrel, supplementary rolls disposed opposite to said mandrel, and positive means for moving said supplementary rolls into operative relation with said mandrel.

17. A tube welding machine comprising a revoluble mandrel, a welding roll disposed opposite to said mandrel, means for moving said roll into operative relation with said mandrel, supplementary rolls disposed opposite to said mandrel, and means independent of said welding roll moving means for moving said supplementary rolls into operative relation with said mandrel.

18. In a tube welding machine, an upright rod, a head supported on the upper end of said rod, parallel rolls revolubly mounted in said head, and means for positively raising and lowering said rod.

19. In a tube welding machine, an upright rod, a head supported on the upper end of said rod, parallel finishing rolls revolubly mounted in said head, means for adjusting the distance between centers of said rolls, and means for raising and lowering said rod.

20. In a tube welding machine, an upright rod, a head supported on the upper end of said rod, oppositely disposed arms pivotally mounted in said head, a roll revolubly mounted on each of said arms in parallel relation with the roll on the other arm, and means coacting with said arms to adjust the distance between centers of said rolls.

21. In a tube welding machine, an upright rod, a head supported on the upper end of said rod, means for adjusting the length of said rod, parallel rolls revolubly mounted in said head, and a foot treadle engaging the base of said rod to raise and lower said rolls.

22. A tube welding machine comprising a base plate, a revoluble mandrel supported on said plate, a revoluble welding roll opposite said mandrel and movable toward and from the same, pneumatic means for moving said roll toward said mandrel, a valve controlling said means, a rod, supplementary roll supported on said rod and movable therewith toward and from said mandrel, a treadle for operating said rod, and valve actuating means connected to said rod and operated by the movement of said rod.

23. A tube welding machine comprising a base plate, a revoluble mandrel supported on said plate, a revoluble welding roll opposite said mandrel and movable toward and from the same, pneumatic means for moving said roll toward said mandrel, a valve controlling said means, a rod, supplementary rolls supported on said rod and movable therewith into operative relation with said mandrel, a treadle for operating said rod, valve actuating means connected to said rod and operated by the movement thereof, and means for adjusting said actuating means.

24. In a tube welding machine, a back rest comprising a hollow standard, a post slidable within said standard, means for adjusting the position of said post in said standard, a head supported on said post, tube supporting rollers carried by said head, and means for adjusting the relative position of said rollers for different sizes of tube.

25. In a tube welding machine, a back rest comprising a standard, an upright post adjustably mounted on said standard, a head supported on the upper end of said post, an anti-friction bearing on said head in alinement with said post to support a tube, and rollers disposed on opposite sides of said bearing to prevent lateral displacement of said tube thereon.

26. In a tube welding machine, a back rest comprising a standard, an upright post adjustably mounted on said standard, a head supported on the upper end of said post, an anti-friction bearing on said head in alinement with said post to support a tube, rollers disposed on opposite sides of said bearing to prevent lateral displacement of said tube thereon, and means for adjusting the relative position of said rollers for different sizes of tube.

27. In a tube welding machine, a revoluble mandrel, a revoluble welding roll disposed opposite to said mandrel and movable toward and from the same, and a driving shaft for said roll comprising a plurality of shaft sections arranged substantially end to end and having their adjoining ends connected by universal joints.

AUGUST C. SCHAEFER.